(12) United States Patent
Kimble

(10) Patent No.: US 8,736,223 B2
(45) Date of Patent: May 27, 2014

(54) WATERCRAFT COVER HAVING INTEGRATED SOLAR POWERED CHARGING COMPONENT AND MATEABLE ASSEMBLY

(76) Inventor: Michael W. Kimble, Orlando, FL (US)

(*) Notice: Subject to any disclaimer, the term of this patent is extended or adjusted under 35 U.S.C. 154(b) by 319 days.

(21) Appl. No.: 13/112,783

(22) Filed: May 20, 2011

(65) Prior Publication Data

US 2011/0309788 A1  Dec. 22, 2011

Related U.S. Application Data

(60) Provisional application No. 61/346,520, filed on May 20, 2010.

(51) Int. Cl.
*H01M 10/46* (2006.01)

(52) U.S. Cl.
USPC .......................................... 320/101; 320/111

(58) Field of Classification Search
USPC ................. 320/101, 104, 109, 114, 115, 111; 136/244, 245, 291, 293
See application file for complete search history.

(56) References Cited

U.S. PATENT DOCUMENTS

| 5,725,062 | A | 3/1998 | Fronek | |
|---|---|---|---|---|
| 6,167,658 | B1 | 1/2001 | Weiner | |
| 6,337,436 | B1 | 1/2002 | Ganz | |
| 7,047,902 | B1 | 5/2006 | Little | |
| 2006/0225781 | A1 | 10/2006 | Locher | |
| 2007/0075676 | A1 | 4/2007 | Novak | |
| 2007/0125417 | A1* | 6/2007 | Johanson et al. | 136/244 |
| 2009/0211621 | A1 | 8/2009 | LeBlanc | |
| 2009/0288698 | A1* | 11/2009 | Chen | 136/244 |
| 2010/0065104 | A1* | 3/2010 | Baruh | 136/251 |
| 2011/0070816 | A1* | 3/2011 | Reichart et al. | 454/75 |
| 2011/0210693 | A1* | 9/2011 | Reichart et al. | 320/101 |

* cited by examiner

*Primary Examiner* — Edward Tso
(74) *Attorney, Agent, or Firm* — Timothy H. Van Dyke; Beusse, Wolter, Sanks, Mora & Maire, P.A.

(57) ABSTRACT

Disclosed herein is a vehicle or watercraft cover that includes a solar battery charging component integrated therewith or attached thereto. Also disclosed is a kit for easily adapting a vehicle or watercraft to connect with a solar battery charging component.

14 Claims, 2 Drawing Sheets

WATERCRAFT COVER HAVING INTEGRATED SOLAR POWERED CHARGING COMPONENT AND MATEABLE ASSEMBLY

CROSS REFERENCE TO RELATED APPLICATIONS

This application is related to U.S. Provisional Application 61/346,520 filed May 20, 2010 to which priority is claimed under 35 USC 119(e). This application is incorporated herein in its entirety.

INTRODUCTION

Boats and personal watercraft (PWC) are often stored for long periods of time. This storage can lead to the undesired drainage of batteries in watercraft, and even degradation of battery life. Launching a watercraft for day filled with boating and water activities can lead to exceptional frustration when the watercraft is nonfunctional due to a dead battery. The inventors have encountered this frustration which has inspired them to realize this problem and to develop a solution.

SUMMARY

Embodiments of the present invention stem from the inventors' discovery that there is a need for an easy to use method of charging a battery contained in a vehicle or watercraft. According to one embodiment, the invention pertains to a flexible cover configured for securing to a vehicle or watercraft. The cover includes a planar cover body having proportions and dimensions especially adapted to enclose a top surface of the intended vehicle or watercraft. In a specific embodiment, a top surface as used herein pertains to a surface exposed to solar radiation emitting onto said vehicle or watercraft from a directly vertical axial direction relative to the vehicle or watercraft or up to, 10, 20 or 30 degrees from said vertical axial direction. The cover body has integrated or attached thereto a solar powered battery charging component. The battery charging component is positioned on the cover body so as to be exposed to solar radiation when said planar cover body is secured to said vehicle or watercraft. The cover may further include a first wire component that has a first end and second end and an intermediate portion between said first and second ends. In a specific embodiment, the first wire component is electrically connected to the battery charging component at the first end and electrically connected, directly or indirectly, to a battery contained within the vehicle or watercraft. By electrically connected indirectly, it is meant that the first wire connector electrically connects by at least one intermediary component, such as another wire component. The flexible cover allows for the charging and/or maintenance of battery charge while protecting said vehicle or watercraft.

In a more specific embodiment, the flexible cover includes a second wire component that has a first end and a second end and an intermediate portion between said first and second ends. The second wire component electrically connects to a socket component secured to the vehicle or watercraft, typically, an exterior thereof. Furthermore, the second end of the second wire component is electrically connected to a battery contained in the vehicle or watercraft. In an even more specific embodiment, the second end of said first wire component indirectly electrically connects to the battery by removably engaging to the socket. The second end of the first wire component may include a projection that plugs into a receptacle defined in the socket.

According to another embodiment, the invention pertains to a kit for charging or maintaining battery charge of a battery contained within a vehicle or watercraft. The kit includes a solar powered battery charging component; a first wire component having a first end and a second end and an intermediate portion between said first and second ends, said first end of said first wire connector being engageable to said battery charging component and said second end of said first wire component comprising at least one projection. The kit may further include a socket component rigidly securable to an exterior of the vehicle or watercraft, the socket component comprising at least one receptacle shaped for receiving said at least one projection. Further, the kit may further include a second wire component having a first end, a second end and an intermediate portion between said first and second ends. The first end of the second wire component being engageable to said socket component and the second end of said second wire component being engageable to said battery. The kit may further include two or more fasteners for rigidly securing the socket to the exterior of the vehicle or watercraft. The fasteners may comprise but are not limited to, screws, rivets, pins, and bolts. In addition to at least one receptacle, the socket may comprise a gasket for abutting against the exterior and a faceplate that rests upon the gasket. The socket may also comprise a removeably engageable cover.

In a more specific embodiment, the kit of may further comprise two connectors for securing the second end of the second wire component to said battery. The kit may further comprise written instructions for installation to the kit to the vehicle or watercraft.

According to another embodiment, the invention pertains to a vehicle or watercraft having a socket component rigidly secured to an exterior thereof, wherein the socket component comprises a receptacle defined therein. The socket has a wire component including a first end electrically connected to such socket and a second end electrically connected to a battery contained in said vehicle or watercraft. The wire component has an intermediate portion between the first and second ends. The socket is configured for removably engaging a solar powered battery charging component via another wire component that plugs into the socket. The socket may comprise a gasket for abutting against the exterior and a faceplate that rests upon the gasket. The socket may also comprise a removeably engageable cover.

According to another embodiment, the invention pertains to a method of charging a battery or maintaining a charge of a battery contained in a vehicle or watercraft. The method includes securing a socket component to an exterior of the vehicle or watercraft, socket comprising a receptacle defined therein. A wire component may be electrically engaged to the socket at one end and electrically engaged to a battery at an opposite end. The method further comprises plugging in another wire component into the receptacle of the socket, the other wire component being electrically connected to a solar powered charging component at one end and having a projection at an opposite end, the projection configured for mating to the receptacle.

DESCRIPTION OF THE ILLUSTRATED EMBODIMENTS

Figure 1:
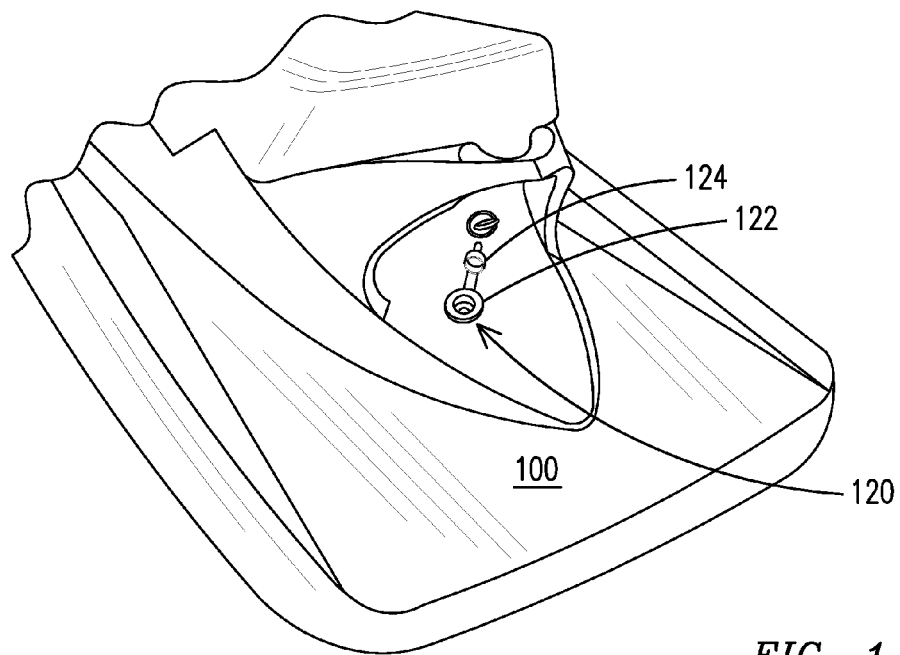
FIG. 1 shows a rear perspective of a watercraft with a socket assembly embodiment rigidly engaged thereto.

Turning to the drawings, FIG. 1 shows a rear perspective view of a PWC 100 having a socket component 120 rigidly engaged to an exterior thereof The socket component includes a receptacle 122 and a removable cover 124 to protect the receptacle 122 from water and debris entering therein.

Figure 2:
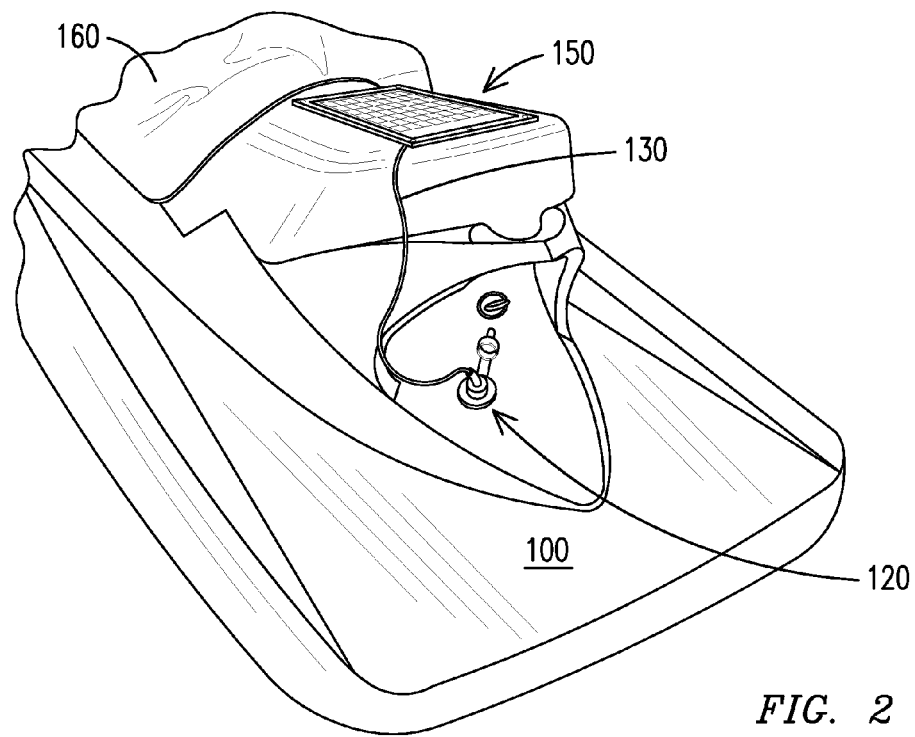
FIG. 2 shows a rear perspective of a watercraft having a solar powered charging component embodiment electrically connected thereto.
Figure 3:
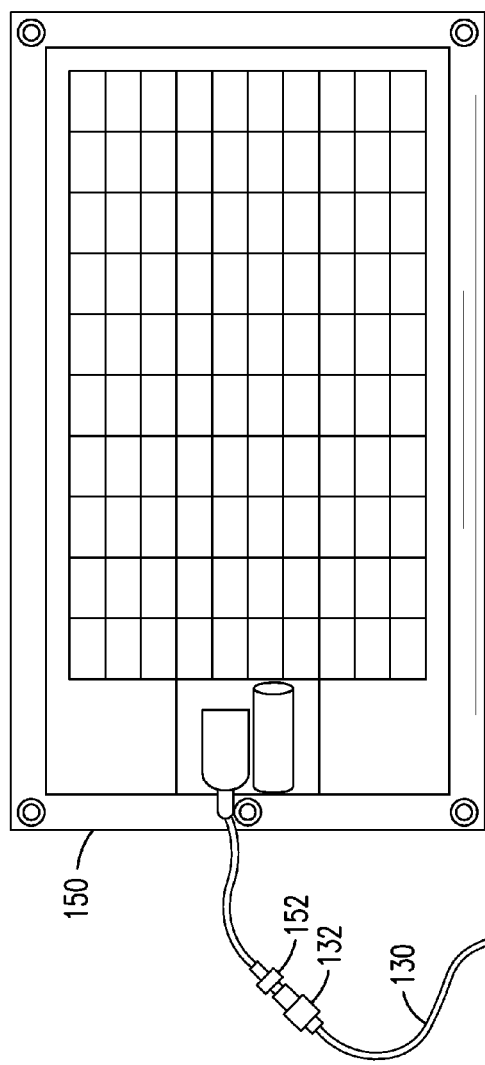
FIG. 3 shows a solar powered charging assembly embodiment for use with a vehicle and/or watercraft.

FIG. 2 shows a rear perspective view of the PWC 100 that has a wire component 130 that is electrically engaged to the socket component 120. The wire component 130 is electrically connected to a solar powered charging component 150. Also shown is a flexible cover component 160 for protecting the PWC. The solar powered charging component can be directly attached or integrated into the flexible cover 160 or separate (as shown). The solar powered battery charging component may be flexible or a rigid planar device, such as one with a glass panel. A non-limiting list of solar powered battery charging components in the field that can be adapted to be utilize with embodiments disclosed herein include, but are not limited to, item no. 38-530-602-00 from Bass Pro Shops, Coleman 58022 12 Volt Solar Trickle Charger 6 Watts, SunForce 50022 12 Volt Solar Panel Battery Trickle Charger 5 Watts FIG. 3 shows a kit assembly especially adapted for installing a battery charger into a PWC. The kit includes a battery charger component 150 that includes a wire extension 152. A wire component 130 electrically connects to the extension 152 at one end and comprises a plug 131 at the other end. The plug 131 includes a projection that inserts into a receptacle into socket 120. Socket 120 includes a cover 124 that removable engages to the socket 120. A wire component 140 is rigidly engaged to the socket at one end and includes attachment means 141a-b at the opposing end. Attachment means are designed for attaching to a battery contained in the PWC. The kit allows for fitting of a socket that is directly connected to the battery that is not cumbersome or which extends out from the PWC in a unsightly way. The kit allows for the facile connection of the battery charging component 150 for maintaining a charger or recharging a battery. The battery charging component may be integrated into a cover.

Figure 4:
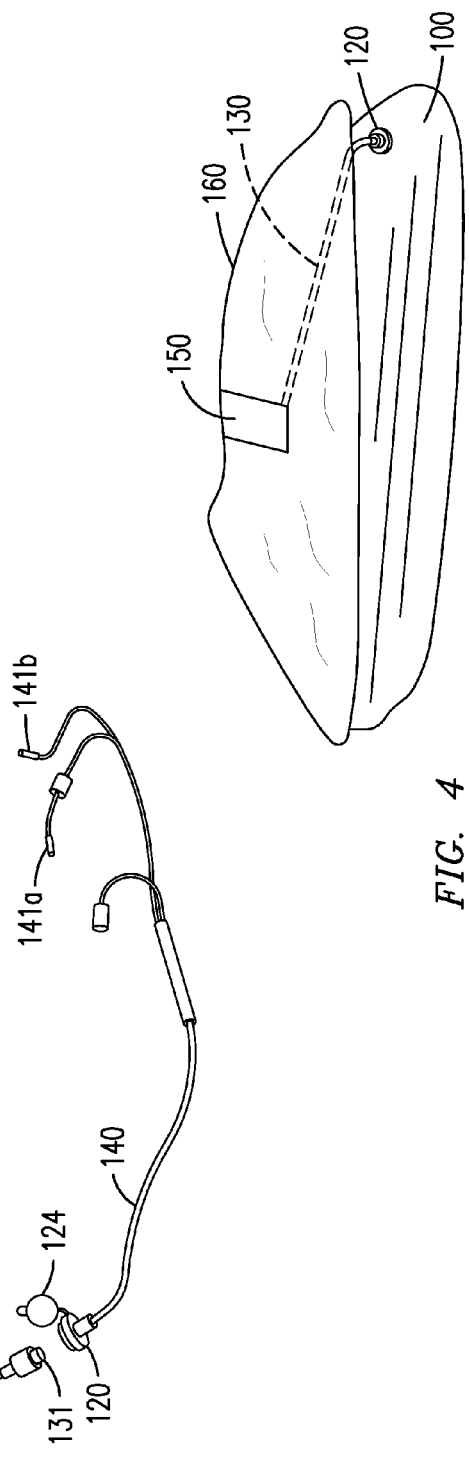
FIG. 4 shows a side view of a PWC having a cover embodiment enclosing a top surface of the PWC.

FIG. 4 shows a cover 160 that is associated with a PWC 100 to protect atop surface thereof. Shown is a battery charging component 150 integrated into the cover 160. A wire component 130 is electrically connected to the battery charging component 150 which also plugs into socket 120. The socket is rigidly engaged to exterior of the PWC.

Although the foregoing description contains many specifics, these are not to be construed as limiting the scope of the present inventions, but merely as providing certain representative embodiments. Similarly, other embodiments of the inventions can be devised which do not depart from the spirit or scope of the present inventions. The scope of the inventions is, therefore, indicated and limited only by the respective appended claims and their legal equivalents, rather than by the foregoing description. All additions, deletions, and modifications to the inventions, as disclosed herein, which fall within the meaning and scope of the claims, are encompassed by the present inventions. The disclosures of any references cited herein are incorporated in their entirety to the extent not inconsistent with the teachings herein.

What is claimed is:

1. A flexible cover configured for securing to a vehicle or watercraft, said cover comprising
    a planar cover body comprised of proportions and shape to fully enclose a top surface of said vehicle or watercraft;
    a solar powered battery charging component integrated to or attached to said planar cover body, said battery charging component positioned on said planar cover body to be exposed to solar radiation when said planar cover body is secured to said vehicle or watercraft;
    a first wire component comprising a first end and second end and an intermediate portion between said first and second ends, said first wire component being electrically connected to said battery charging component at said first end and electrically connected, directly or indirectly, to a battery contained within said vehicle or watercraft; wherein said flexible cover allows for the charging and/or maintenance of battery charge while protecting said vehicle or watercraft.

2. The flexible cover of claim 1, further comprising a second wire component, said second wire component comprising a first end and a second end and an intermediate portion between said first and second ends, said first end being electrically connected to a socket secured to the vehicle or watercraft and said second end is electrically connected to said battery.

3. The flexible cover of claim 2, wherein said second end of said first wire component indirectly electrically connects to said battery by removably engaging to said socket.

4. The flexible cover of claim 3, wherein said second end of said first wire component comprises a projection that plugs into a receptacle defined in said socket.

5. The flexible cover of claim 2, wherein said first end of said second wire component is engaged to said socket.

6. The flexible cover of claim 2, wherein said second end of said second wire component is engaged to said battery.

7. A kit for charging or maintaining battery charge of a battery contained within a vehicle or watercraft, said kit comprising:
    a solar powered battery charging component;
    a first wire component comprising a first end and a second end and an intermediate portion between said first and second ends, said first end of said first wire component being engaged to said battery charging component and said second end of said first wire component comprising at least one connector;
    a socket component securable to said vehicle or watercraft so as to be exteriorly accessible, said socket component comprising at least one receptacle shaped for mating with said at least one connector; and
    a second wire component comprising a first end, a second end and an intermediate portion between said first and second ends, said first end of said second wire component being engageable to said socket component and said second end of said second wire component being engageable to said battery.

8. The kit of claim 7, further comprising two or more fasteners for securing said socket to said exterior.

9. The kit of claim 7 further comprising two connectors for securing said second end of said second wire component to said battery.

10. The kit of claim 7, further comprising written instructions for installation to said kit to said vehicle or watercraft.

11. A vehicle or watercraft comprising a socket component secured to an exterior thereof; a wire component comprising a first end electrically connected to said socket and a second end electrically connected to a battery contained in said vehicle or watercraft, and an intermediate portion between said first and second ends, said socket configured for removably engaging a solar powered battery charging component via another wire component.

12. The vehicle or watercraft of claim 11, wherein said another wire component comprises an end with a connector configured for mating with said socket.

13. The vehicle or watercraft of claim 11, wherein said solar powered battery charging component is integrated with or attached to a flexible cover configured for securing to a vehicle or watercraft.

14. The vehicle or watercraft of claim 13, wherein said flexible cover comprises a planar cover body comprised of proportions and shape to fully enclose a top surface of said vehicle or watercraft; and wherein said solar powered battery charging component is positioned so as to be exposed to solar radiation when said planar cover body is secured to said vehicle or watercraft.

* * * * *